UNITED STATES PATENT OFFICE.

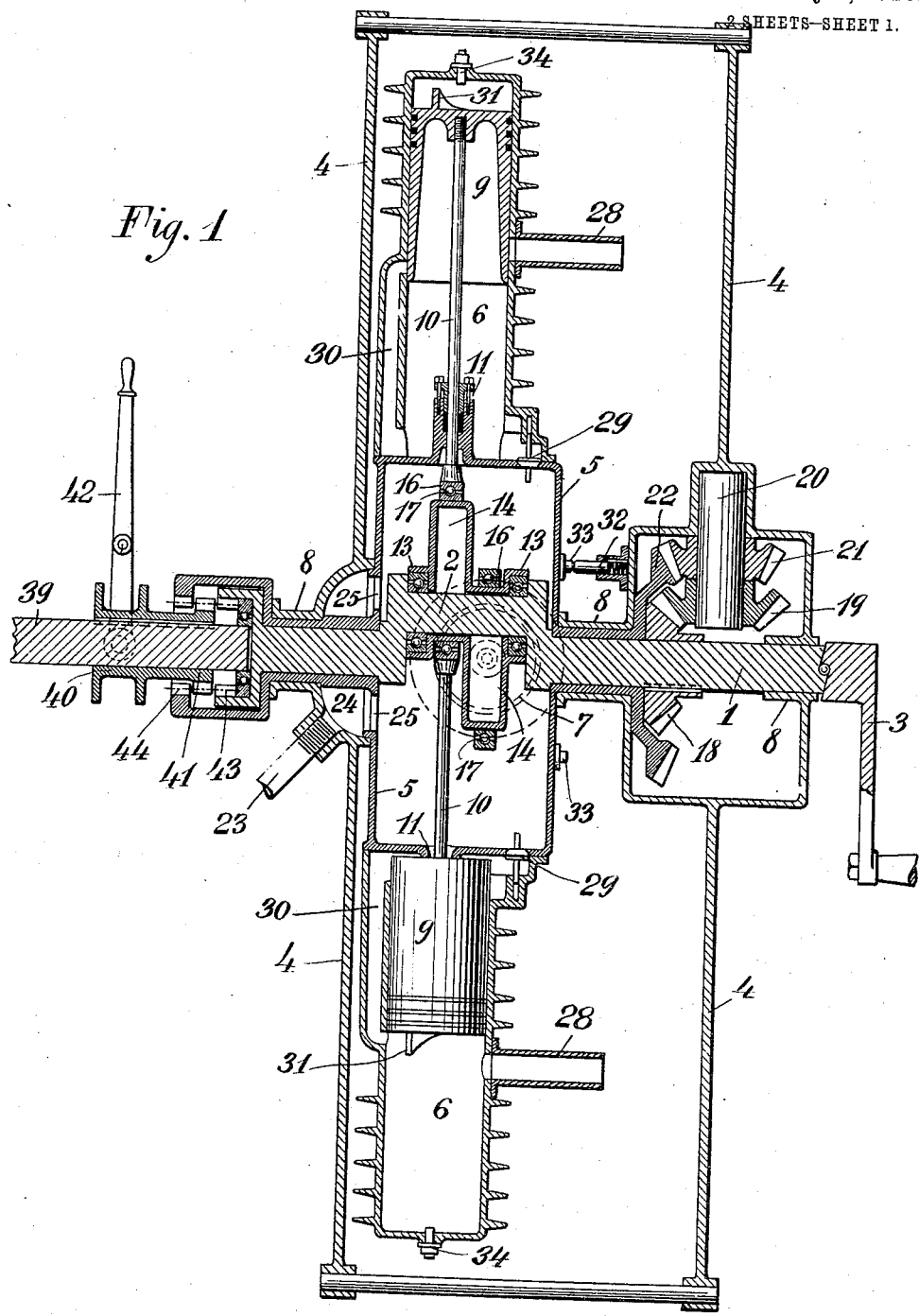

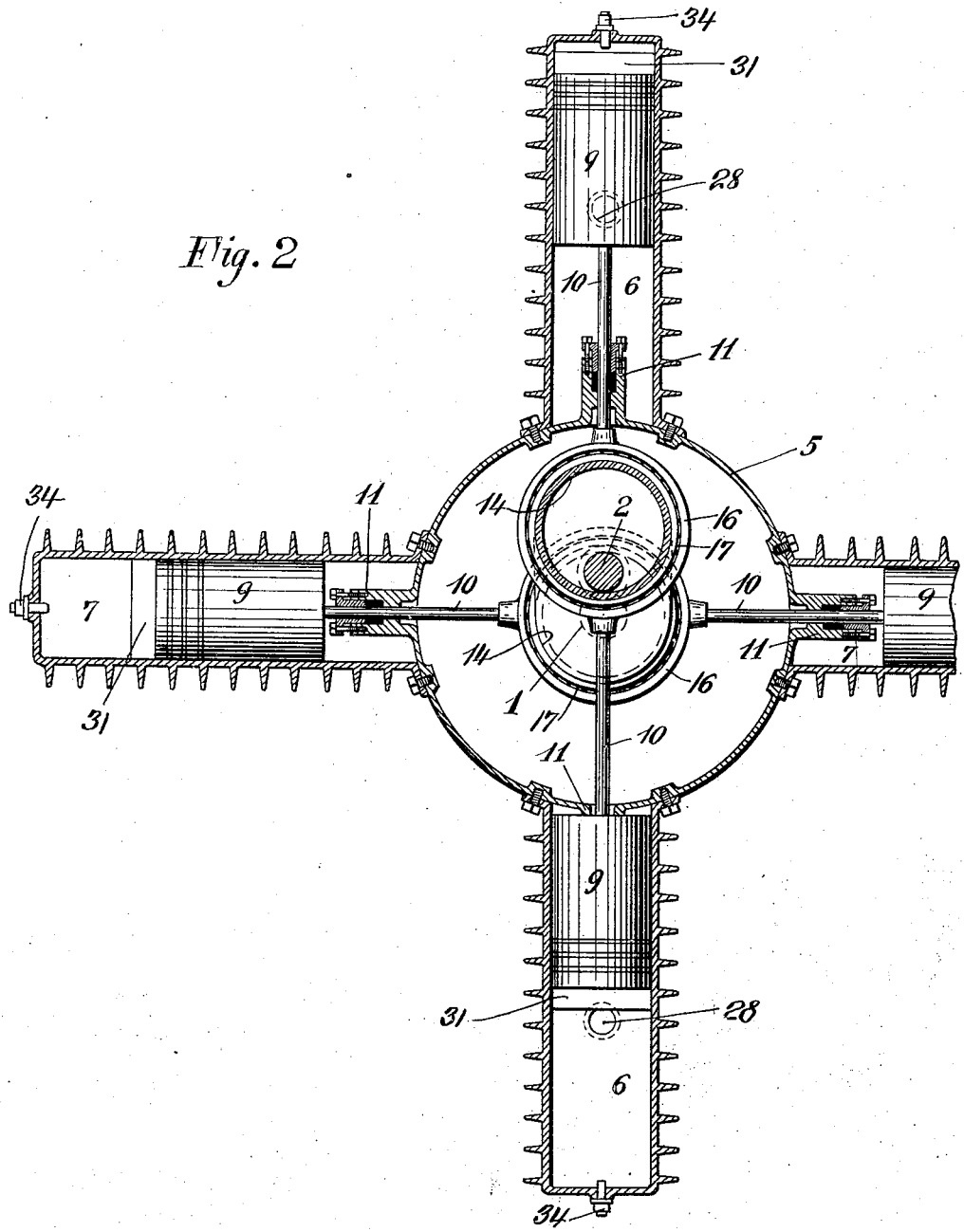

CORNELIUS H. TANGEMAN, OF NEW YORK, N. Y.

ROTARY COMBUSTION-ENGINE.

1,061,025.   Specification of Letters Patent.   Patented May 6, 1913.

Application filed March 10, 1910. Serial No. 548,475.

*To all whom it may concern:*

Be it known that I, CORNELIUS H. TANGEMAN, a citizen of the United States, residing at New York, in the county of New York and State of New York, have invented certain new and useful Improvements in Rotary Combustion-Engines, of which the following is a full, clear, and exact specification.

This invention relates to combustion engines, and has especial reference to an engine wherein the cylinders rotate differentially with respect to the crank shaft.

The object of the invention is to construct a rotary engine wherein the cylinders rotate at one speed, and concentrically therewith the crank shaft rotates in the same direction at a different speed, in combination with means whereby either the crank shaft or the cylinders may be connected with the part to be driven, thereby producing two direct driving speeds in a simple and effective manner.

According to this invention, I have provided a combustion engine, preferably of the two cycle type comprising a plurality of pairs of oppositely disposed cylinders mounted to rotate around a crank shaft, the pistons of opposite cylinders being connected by a rigid straight connecting rod having cranked engagement with the crank shaft, and the crank shaft being geared to rotate the cylinders concentrically and in the same direction at one half the speed of the crank shaft. At one end of the engine is a clutch mechanism operating to permit a driven shaft to be clutched either to the crank shaft or to the cylinders, and thereby directly driven at two speeds.

The invention will be more fully understood in connection with the form thereof illustrated in the accompanying drawings, wherein—

Figure 1 is a longitudinal section of an engine embodying the invention, and Fig. 2 is a transverse section through the cylinders.

1 represents a main shaft having a crank 2, and a starting handle 3, journaled in a stationary frame 4.

5 is a rotatable casing having mounted thereon pairs of cylinders 6, 6, 7, 7. It will be seen that the casing 5 incloses the crank shaft 1, and is itself carried in bearings 8, 8, 8 of the frame 4. Mounted in each cylinder are pistons 9, 9, 9, 9, rigidly connected by straight connecting rods 10, which pass through stuffing boxes 11 at the base of each cylinder 6. Journaled on the crank shaft 2 in bearings 13, 13 are a pair of eccentrics 14, 14, positioned 180° apart and rotating around the crank 2 as a center. Each of the connecting rods 10 carries a strap 16, preferably having an interposed ball bearing 17 surrounding the eccentrics 14. The main shaft 1 carries a bevel gear 18 which meshes with a similar gear 19 on a short stub shaft 20 journaled in the frame 4, and shaft 20 carries a second bevel gear 21 which meshes with a bevel gear 22 carried by the cylinder base 5. The gears 21, 22 have a ratio of 2 to 1, and consequently when the main shaft 1 is rotated by the explosions in the usual manner, the cylinders will be rotated at one half the speed in the same direction. By reason of this relation between the rotation of the cylinders and the crank shaft, it will be seen that the center of the shaft 1 will always be common to the point where the connecting rods 10 cross each other, and thereby rotation will be imparted to the crank pin through the connecting rods without displacing the center of the crank pin from the point of crossing of the two connecting rods.

As herein shown, the invention is applied to a two cycle engine, 23 being an inlet from a carbureter to chamber 24 in the frame 4, having ports 25 leading to the interior of rotary base 5. Inasmuch as stuffing boxes 11 close the space below the pistons 9, while the pistons close exhaust pipes 28, the charges will be drawn from the interior of base 5 through check valves 29 when the pistons rise, and compressed therein until the piston clears by-pass 30 in each cylinder at the outer portion of the stroke, thereby allowing the compressed charge to be discharged above the piston against the usual baffle plate 31, and deflected upward to drive the burned charges out through the now opened exhaust. For properly timing and igniting the charges current may be led to a contact 32, and thence to contacts 33 on the rotating base 5, and from contacts 33 to spark plugs 34.

39 is a driven shaft having splined thereto a sleeve 40 carrying a clutch 41, which may be operated by lever 42 to engage with teeth 43, carried by the crank shaft to drive the shaft 39 at the high speed, or the teeth 41 may be engaged with teeth 44 on the end of the engine casing to drive shaft 39 at the lower speed, the drive in both instances being direct.

From the foregoing description it is thought that the operation and advantages of the invention will be fully understood, it being seen that the stroke is equal to the combined throws of the eccentrics and crank shaft. Suitable throttle and spark controlling devices will be employed, which are omitted herein because not essential to an understanding of this invention.

So far as I am aware, it is broadly new to provide an engine having both the cylinders and crank shaft concentric and rotatable in the same direction at different speeds, whereby a shaft may be directly driven from either at different speeds. Various modifications and changes in the specific construction herein described may be made without departing from the scope of the invention.

Having thus described my invention I declare that what I claim as new and desire to secure by Letters Patent, is—

1. The combination in an explosion engine having rotating cylinders, pistons therein, a crank shaft connected to said cylinders by gearing to be driven by said pistons in the same direction at a different speed, a driven shaft, and means for driving said shaft from either said cylinders or said crank shaft.

2. The combination in an explosion engine with opposite rotatably mounted cylinders, of pistons therein connected by a rigid connecting rod, a crank shaft mounted concentrically with the axis of rotation of said cylinders and having cranked connection with said connecting rod, gearing between said cylinders and said crank shaft for driving the latter in the same direction at double speed, a driven shaft and means for connecting said shaft to said cylinders or to said crank shaft.

3. The combination with an explosion engine comprising cylinders rotating at one speed and a crank shaft rotating at a different speed in the same direction, of a driven shaft, and means for effecting a driving engagement between said shaft and said cylinders or said crank shaft to obtain two speeds for power purposes in the same direction.

4. The combination with an explosion engine comprising cylinders rotating at one speed and a crank shaft concentric with the axis of rotation of said cylinders rotating at a different speed in the same direction, of a driven shaft, and means for effecting a driving engagement between said shaft and said cylinders or said crank shaft to obtain two speeds for power purposes in the same direction.

5. The combination with an explosion engine comprising cylinders rotating at one speed and a crank shaft rotating at twice the speed in the same direction, of a driven shaft, and means for effecting a driving engagement between said shaft and said cylinders or said crank shaft to obtain two speeds.

6. A rotary explosion engine comprising rotatable cylinders and pistons, and a crank shaft concentric with the axis of rotation of the cylinders and rotatable in the same direction at twice the speed of the cylinders, said pistons having a stroke greater than the throw of the crank.

In testimony whereof I affix my signature, in presence of two witnesses.

CORNELIUS H. TANGEMAN.

Witnesses:
J. C. REDMOND,
J. B. HAINES.

Copies of this patent may be obtained for five cents each, by addressing the "Commissioner of Patents, Washington, D. C."